Patented June 21, 1949

UNITED STATES PATENT OFFICE 2,474,095

PRODUCTION OF POLYVINYL KETALS

William Robert Cornthwaite and Nestor Winston Flodin, Niagara Falls, N. Y., assignors to E. I. du Pont de Nemours & Company, Wilmington, Del., a corporation of Delaware No Drawing. Application November 27, 1944, Serial No. 565,400

6 Claims. (Cl. 260—66)

This invention relates to the production of polyvinyl ketals, and more particularly it relates to the production of new polyvinyl ketals from a vinyl alcohol-containing polymer and a diketone.

Polyvinyl ketals have been produced heretofore by reacting an alkyl ketal with polyvinyl alcohol or by reacting an aliphatic ketone with polyvinyl acetate. With the exception of cyclohexanone, it has, heretofore, been considered infeasible to carry out a direct reaction between a ketone and polyvinyl alcohol. In order to form a polyvinyl ketal from an aliphatic ketone, it has, therefore, been necessary to first convert the aliphatic ketone to an alkyl ketal and react the polyvinyl alcohol with the alkyl ketal; to react the aliphatic ketone with a polyvinyl ester; or to react a polyvinyl ester with a ketone in the presence of a de-esterifying agent in the manner described in U. S. Patent No. 2,227,975.

It is an object of this invention to provide a process for the formation of polyvinyl ketals by direct reaction of a vinyl alcohol-containing polymer with a ketone.

It is another object of this invention to provide a process for the production of new polyvinyl ketals which have a particularly desirable adhesion to glass surfaces.

It is another object of this invention to produce a polyvinyl ketal which contains an unreacted carbonyl group.

Other objects of this invention will appear hereinafter.

The objects of this invention may be accomplished, in general, by reacting, preferably at a temperature between 50° C. and 200° C., a mixture comprising a vinyl alcohol-containing polymer, and a diketone taken from the class consisting of diacetyl, acetyl acetone and acetonyl acetone, in the presence of an acid catalyst. It has now been found that these three diketones will directly react with polyvinyl alcohol, or other vinyl alcohol-containing polymer to form the corresponding polyvinyl ketal. The resultant product, if formed in the presence of excess diketone, contains an unreacted carbonyl group, the reaction taking place with only one carbonyl group. If the polyvinyl alcohol or vinyl alcohol-containing polymer is present in excess, both carbonyl groups of the diketone may react. The reaction in the presence of excess diketone is believed to take place as follows:

1. Reaction of polyvinyl alcohol with diacetyl

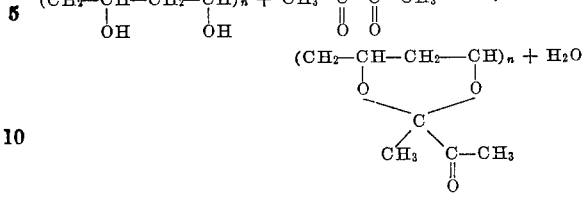

2. Reaction of polyvinyl alcohol with acetyl acetone

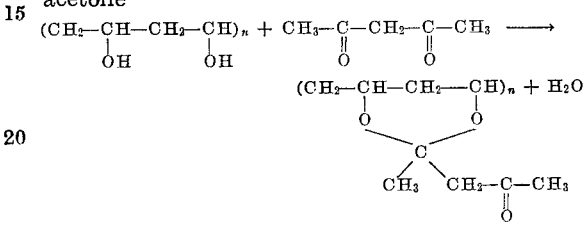

3. Reaction of polyvinyl alcohol with acetonyl acetone

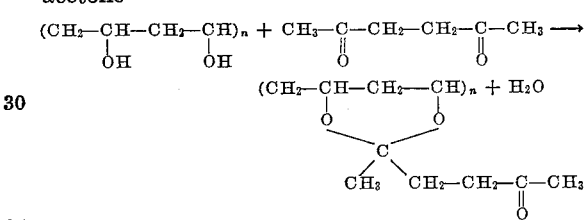

The following examples are given to show, in specific detail, certain preferred, illustrative methods for carrying out the processes of the present invention, it being understood, of course, that the invention is not limited to the specific details set forth therein.

Example I

A mixture of 4.4 grams completely hydrolyzed polyvinyl alcohol (saponification number less than 15) having a viscosity of about 50 centipoises, 0.6 gram zinc chloride, 1.7 grams concentrated hydrochloric acid, and 21 grams diacetyl was heated at 85° C. for four hours. The product was dissolved in acetone and reprecipitated in water. Traces of acid were neutralized with sodium hydroxide and the solid filtered off. The solid was washed with water having a temperature of 60° C. and then dried at 75° C. for four hours. The weight of the brown solid thus obtained was 7.6 grams. The net loss was estimated to be 0.5 gram, giving a net yield of 8.1 grams. The resulting diacetyl ketal of polyvinyl alcohol is insoluble in water, and liberates diacetyl slowly when heated with 1 N. hydrochloric acid. Films cast from an acetone solution of the ketal adhered strongly to glass.

*Example II*

A mixture of 4.4 grams of polyvinyl alcohol identical to that used in Examples I and II, 29 grams acetonyl acetone, 0.6 gram zinc chloride, and 1.7 grams concentrated hydrochloric acid was heated at a temperature of 85° C. for four hours. The resulting mixture, after cooling, was poured into water. The precipitated acetonyl acetone ketal of polyvinyl alcohol was filtered off, neutralized, washed with hot water, and dried at 75° C. for 48 hours. The yield of brown ketal was 4.5 grams. The acetonyl acetone ketal of polyvinyl alcohol thus obtained is insoluble in both cold and boiling hot water, and liberates acetonyl acetone slowly when heated with 1 N. hydrochloric acid.

The following additional example illustrates that the diketone ketal of polyvinyl alcohol can also be obtained by reacting polyvinyl acetate with the diketone in the presence of a de-esterifying agent.

*Example III*

To a solution of 43 grams polyvinyl acetate (substantially completely acetylated) in 250 grams methanol and 50 grams acetyl acetone, stirred at reflux, was added 6 grams zinc chloride and 17 grams concentrated hydrochloric acid. Within 3 hours a precipitate had appeared. Heating at reflux temperature, with stirring was continued for four more hours. The product was filtered off, washed by decantation twice with methanol having a temperature of 70° C. and then dried overnight at a temperature of 70° C. The yield of 24 grams of the acetyl acetone ketal of polyvinyl alcohol indicated that only a small percentage of the hydroxyl groups of the polyvinyl alcohol, formed by alcoholysis of the acetate, had reacted with the acetyl acetone. The product was insoluble in water, methanol and water-methanol mixtures. It was hydrolyzed to polyvinyl alcohol and acetyl acetone, and dissolved, by hot water containing a little hydrochloric acid.

The process of the present invention can be carried out with any vinyl alcohol-containing polymer, i. e., any polymer containing vinyl alcohol

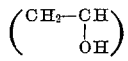

units. The process can be carried out with substantially completely hydrolyzed polyvinyl alcohol as illustrated in the examples, or it can be carried out with partially hydrolyzed polyvinyl esters; for example, 90%, 50% or even 25% hydrolyzed polyvinyl acetate. The reaction can also be readily carried out with vinyl alcohol-containing copolymers, particularly, copolymers with other polymerizable ethylenic compounds; for example, vinyl alcohol-vinyl chloride copolymer, vinyl alcohol-vinylidene copolymer, vinyl alcohol-ethylene copolymer, vinyl alcohol-methyl methacrylate copolymers, vinyl alcohol-acrylonitrile copolymer, and partially hydrolyzed copolymers of vinyl esters with other polymerizable ethylenic compounds.

The reaction may be carried out generally, by use of an acid catalyst, for example, a hydrogen halide, hydrogen chloride with zinc chloride, hydrogen chloride with stannous chloride, sulfuric acid, phosphoric acid, para-toluene sulfonic acid and like strong acids.

The reaction is preferably carried out with stirring or otherwise agitating the reactants; however, this is not essential. The reaction can be carried out at room temperature; however, it is preferred that it be carried out at an elevated temperature between 50° C. and 200° C. The product of the reaction is preferably precipitated in water from a methanol or acetone solution in order to remove impurities from the ketal. In order to obtain the best results the water in which the ketal is precipitated should contain a sufficient amount of an alkaline agent, for example, sodium hydroxide, sodium acetate, ammonium hydroxide, to neutralize any acid present.

The reaction of the present invention will also readily take place in an inert or indifferent solvent, for example, dioxane or benzene.

The ketals of the present invention, when prepared by reaction of one of the above-said diketones with substantially completely hydrolyzed polyvinyl acetate, are readily soluble in methyl or ethyl alcohol or acetone, and are substantially insoluble in hot or cold water. They adhere particularly tenaciously to glass and have especial utility in the production of safety glass.

Since it is obvious that many changes and modifications can be made in the specifically described details above set forth without departing from the nature and spirit of the invention, it is to be understood that this invention is not to be limited to the above said details except as set forth in the appended claims.

We claim:

1. A process for the production of a ketal which comprises mixing, in the presence of an acid catalyst, as the sole reactants, a vinyl alcohol-containing polymer and a diketone taken from the group consisting of diacetyl, acetyl acetone, and acetonyl acetone, the diketone being present in excess of the theoretical amount necessary to react with the said polymer, and heating the mixture at a temperature between 50° C. and 250° C., whereby a yield of about 50% of polyvinyl ketal containing an unreacted aliphatic ketone group may be obtained in a reaction period of four hours.

2. A process for the production of a ketal which comprises mixing, in the presence of a hydrogen halide catalyst, as the sole reactants, a vinyl alcohol-containing polymer and a diketone taken from the group consisting of diacetyl, acetyl acetone, and acetonyl acetone, the diketones being present in excess of the theoretical amount necessary to react with the said polymer, and heating the mixture at a temperature between 50° C. and 250° C., whereby a yield of about 50% of polyvinyl ketal containing an unreacted aliphatic ketone group may be obtained in a reaction period of four hours.

3. A process for the production of a ketal which comprises mixing, in the presence of hydrochloric acid, as the sole reactants, a vinyl alcohol-containing polymer and a diketone taken from the group consisting of diacetyl, acetyl acetone, and acetonyl acetone, the diketone being present in excess of the theoretical amount necessary to react with the said polymer, and heating the mixture at a temperature between 50° C. and 250° C., whereby a yield of about 50% of polyvinyl ketal containing an unreacted aliphatic ketone group may be obtained in a reaction period of four hours.

4. A process for the production of a ketal which comprises mixing, in the presence of an acid catalyst, as the sole reactants, polyvinyl alcohol and a diketone taken from the group consisting of diacetyl, acetyl acetone, and acetonyl acetone, the diketone being present in excess of the theoretical amount necessary to react with the said polyvinyl alcohol and heating the mixture at a temperature between 50° C. and 250° C., whereby a yield of about 50% of polyvinyl ketal containing an unreacted aliphatic ketone group may be obtained in a reaction period of four hours.

5. A process for the production of a ketal which comprises mixing, in the presence of an acid catalyst, as the sole reactants, a polymer containing at least 25% vinyl alcohol groups and the remainder vinyl ester groups and a diketone taken from the group consisting of diacetyl, acetyl acetone, and acetonyl acetone, the diketone being present in excess of the theoretical amount necessary to react with the said polymer, and heating the mixture at a temperature between 50° C. and 250° C., whereby a yield of about 50% of polyvinyl ketal containing an unreacted aliphatic ketone group may be obtained in a reaction period of four hours.

6. A process for the production of a ketal which comprises mixing, in the presence of an acid catalyst, as the sole reactants, a polymer containing at least 25% vinyl alcohol groups and the remainder vinyl acetate groups and a diketone taken from the group consisting of diacetyl, acetyl acetone, and acetonyl acetone, the diketone being present in excess of the theoretical amount necessary to react with the said polymer, and heating the mixture at a temperature between 50° C. and 250° C., whereby a yield of about 50% of polyvinyl ketal containing an unreacted aliphatic ketone group may be obtained in a reaction period of four hours.

WILLIAM ROBERT CORNTHWAITE.
NESTOR WINSTON FLODIN.

REFERENCES CITED

The following references are of record in the file of this patent:

UNITED STATES PATENTS

| Number | Name | Date |
|---|---|---|
| 2,332,896 | D'Alelio | Oct. 26, 1943 |
| 2,378,199 | D'Alelio | June 12, 1945 |
| 2,388,802 | Ryan | Nov. 13, 1945 |